United States Patent [19]

Mark et al.

[11] Patent Number: 4,554,309
[45] Date of Patent: Nov. 19, 1985

[54] POLYCARBONATE FROM CYCLOALKYLIDENE TETRA ALKYL SUBSTITUTED DIPHENOL

[75] Inventors: Victor Mark, Evansville; Charles V. Hedges, Mt. Vernon, both of Ind.

[73] Assignee: General Electric Company, Mt. Vernon, Ind.

[21] Appl. No.: 620,712

[22] Filed: Jun. 14, 1984

Related U.S. Application Data

[63] Continuation-in-part of Ser. No. 453,105, Dec. 27, 1982, abandoned.

[51] Int. Cl.$^4$ ............................................. C08G 63/62
[52] U.S. Cl. ................................. 524/611; 524/157; 525/439; 525/444; 525/463; 528/176; 528/193; 528/194; 528/196; 528/204; 568/716
[58] Field of Search ............... 528/196, 204; 524/157, 524/611; 525/463

[56] References Cited

U.S. PATENT DOCUMENTS

| | | | |
|---|---|---|---|
| 3,422,065 | 1/1969 | Wulff et al. | 260/47 |
| 3,525,712 | 8/1970 | Kramer | 528/196 |
| 3,635,895 | 1/1972 | Kramer | 528/196 |
| 4,020,045 | 4/1977 | Baggett | 528/196 |
| 4,055,544 | 10/1977 | Baggett | 528/196 |
| 4,129,546 | 12/1978 | Axelrod et al. | 260/31.8 |
| 4,180,651 | 12/1979 | Mark . | |
| 4,195,156 | 3/1980 | Bruckdorfer | 528/171 |
| 4,299,948 | 11/1981 | Weirauch et al. | 528/171 |
| 4,304,899 | 12/1981 | Mark et al. | 528/171 |
| 4,310,652 | 1/1982 | DeBona et al. | 528/125 |

Primary Examiner—Harold D. Anderson
Attorney, Agent, or Firm—Myron B. Kapustij; Martin B. Barancik

[57] ABSTRACT

Thermoplastic polymer exhibiting improved heat resistance comprised of the polymerized reaction products of (i) a carbonate precursor, and (ii) at least one dihydric phenol represented by the general formula

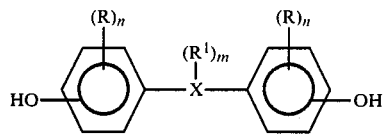

wherein:
R is independently selected from alkyl radicals;
$R^1$ is independently selected from monovalent hydrocarbon radicals;
X is selected from cycloalkylidene radicals containing from 8 to about 16 ring carbon atoms;
each n is two; and
m represents a whole number having a value of from 0 up to the number of replaceable hydrogen atoms present on X.

50 Claims, No Drawings

POLYCARBONATE FROM CYCLOALKYLIDENE TETRA ALKYL SUBSTITUTED DIPHENOL

RELATED APPLICATIONS

This application is a continuation-in-part application of copending application Ser. No. 453,105, filed Dec. 27, 1982, now abandoned.

BACKGROUND OF THE INVENTION

Polycarbonates are well known thermoplastic materials which due to their many advantageous properties find use as thermoplastic engineering materials in many commercial and industrial applications. The polycarbonates exhibit, for example, excellent properties of toughness, flexibility, impact resistance, and heat resistance. The polycarbonates are generally prepared by the coreaction of a dihydric phenol such as bisphenol-A with a carbonate precursor such as phosgene.

While presently available conventional polycarbonates are quite useful in a wide range of applications there nevertheless exists a need, especially in applications involving high temperature environements, for polycarbonates exhibiting greater heat resistance than that possessed by conventional polycarbonates.

It is, therefore, an object of the instant invention to provide polycarbonates which exhibit improved heat resistance.

SUMMARY OF THE INVENTION

In accordance with the instant invention there are provided linear polycarbonate resins which exhibit improved heat resistance.

These polycarbonates are generally comprised of at least one repeating structural unit represented by the general formula

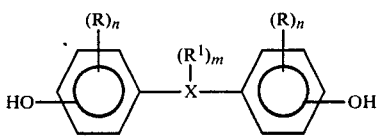

wherein:
R is independently selected from alkyl radicals;
$R^1$ is independently selected from monovalent hydrocarbon radicals;
X represents a monocyclic cycloalkylidene radical containing from 8 to about 16 ring carbon atoms;
n represents the number two; and
m is selected from whole numbers having a value of from 0 up to the number of replaceable hydrogen atoms present on X.

DESCRIPTION OF THE INVENTION

It has been discovered that linear carbonate polymers can be obtained which exhibit improved heat resistance as compared to conventional polycarbonates.

These novel polycarbonates are derived from:
(i) a carbonate precursor; and
(ii) at least one novel dihydric phenol represented by the general formula

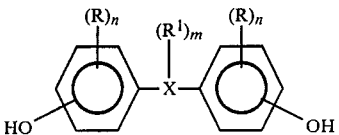

wherein:
R is independently selected from halogen radicals, monovalent hydrocarbon radicals, and monovalent hydrocarbonoxy radicals;
$R^1$ is independently selected from monovalent hydrocarbon radicals;
X represents a monocyclic cycloalkylidene radical containing from 8 to about 16 ring carbon atoms;
n is indepenedntly selected from whole numbers having a value of from 0 to 4 inclusive; and
m is a whole number having a value of from 0 up to the number of hydrogen atoms present on X available for replacement.

The halogen radicals represented by R are preferably selected from chlorine and bromine.

The monovalent hydrocarbon radicals represented by R are selected from alkyl radicals, aryl radicals, aralkyl radicals, alkaryl radicals, and cycloalkyl radicals. The preferred alkyl radicals represented by R are those containing from 1 to about 8 carbon atoms. Some illustrative nonlimiting examples of these alkyl radicals include methyl, ethyl, propyl, isopropyl, butyl, isobutyl, tertiary butyl, pentyl, neopentyl, and the like. The preferred aryl radicals represented by R are those containing from 6 to 12 carbon atoms, i.e. phenyl, naphthyl and biphenyl. The preferred aralkyl and alkaryl radicals represented by R are those containing from 7 to about 14 carbon atoms. Some illustrative non-limiting examples of these alkaryl and aralkyl radicals include benzyl, tolyl, ethylphenyl, and the like. The preferred cycloalkyl radicals represented by R are those containing from 4 to about 6 ring carbon atoms and include cyclobutyl, cyclopentyl and cyclohexyl.

The monovalent hydrocarbonoxy radicals represented by R are preferably selected from alkoxy and aryloxy radicals. The preferred alkoxy radicals are those containing from 1 to about 8 carbon atoms and include, for example, methoxy, butoxy, propoxy, isopropxy, and the like. The preferred aryloxy radical is phenoxy.

Preferably R is independently selected from monovalent hydrocarbon radicals, with the alkyl radicals being the preferred hydrocarbon radicals.

The monovalent hydrocarbon radicals represented by $R^1$ are selected from alkyl radicals, aryl radicals, alkaryl radicals, aralkyl radicals, and cycloalkyl radicals. The preferred alkyl radicals are those containing from 1 to about 8 carbon atoms. Some illustrative non-limiting examples of these alkyl radicals include methyl, ethyl, propyl, isopropyl, butyl, isobutyl, tertiary butyl, pentyl, neopentyl, and the like. The preferred aryl radicals are those containing from 6 to 12 carbon atoms, i.e., phenyl, naphthyl and biphenyl. The preferred aralkyl and alkaryl radicals represented by $R^1$ are those containing from 7 to about 14 carbon atoms. Some illustrative non-limiting examples of these preferred aralkyl and alkaryl radicals include benzyl, tolyl, ethylphenyl, and the like. The preferred cycloalkyl radicals represented by $R^1$ are those containing from 4 to 6 ring carbon atoms, i.e., cyclobutyl, cyclopentyl and cyclohexyl.

The preferred monovalent hydrocarbon radicals represented by $R^1$ are the alkyl radicals.

In Formula I m preferably has a value of from 0 to about 4.

In the dihydric phenol compounds of Formula I if more than one R substituent is present on the aromatic nuclear residue they can be the same or different.

Likewise, if more than one $R^1$ substituent is present on the cycloalkylidene radical represented by X they may be the same or different.

The cycloalkylidene radicals represented by X are the mono-cyclic cycloalkylidene radicals which may be represented by the general formula

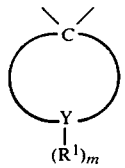

wherein $R^1$ and m are as defined hereinafore, and Y represents an alkylene radical containing from 7 to about 15 carbon atoms which together with the C atom form a mono-cyclic cycloalkylidene radical containing from 8 to about 16 ring carbon atoms. That is to say, Y represents the $(-CH_2-)_r$ radical wherein r is a positive integer having a value of from 7 to about 15.

The term mono-cyclic as used herein with respect to the cycloakylidene radicals is meant to specify that the cycloalkylidene radicals contain only one ring, i.e., they are non-polycyclic. Thus these non-polycyclic cycloalkylidene radicals do not include those cyclic groups which are not monocyclic, e.g., bicyclic, bridged or fused cyclic structures such as 2-norbornylidene, bicyclo (3,3, 0)octylene, and decahydronaphthylene.

Preferred polycarbonates, from the standpoint of exhibiting particularly improved heat resistance, are those containing at least one repeating structural unit represented by the general formula

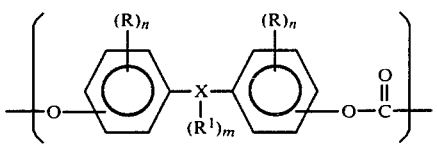

wherein:
R is independently selected from alkyl radicals;
$R^1$ is independently selected from monovalent hydrocarbon radicals;
X represents a cycloalkylidene radical containing from 8 to about 16 carbon atoms;
n represents the number two; and
m is selected from a whole number having a value of from 0 up to the number of replaceable hydrogen atoms present on X.

These polycarbonates are derived from dihydric phenols of Formula I wherein each n is two and R is independently selected from alkyl radicals, i.e., those dihydric phenols having the general formula

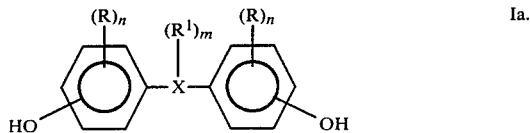

wherein R is independently selected from alkyl radicals, each n is 2, and X is a cycloalkylidene radical containing from 8 to about 16 ring carbon atoms.

The preferred alkyl radicals represented by R in Formulae II and Ia are the lower alkyl radicals containing from 1 to about 4 carbon atoms.

Preferred polycarbonates are those containing recurring structural units of Formula II wherein m is zero. These polycarbonates are derived from dihydric phenols of Formula Ia wherein m is zero.

Preferred polycarbonates containing recurring structural units of Formula II where m is zero are those containing repeating units represented by the formula

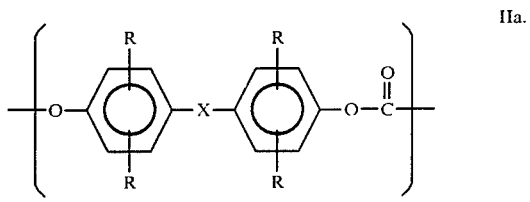

where X and R are as defined in Formula II. These linear polycarbonates are derived from dihydric phenols of the formula

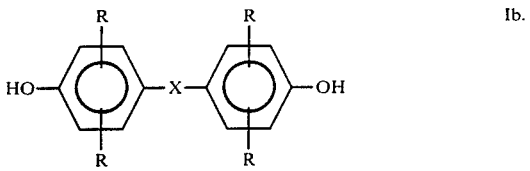

wherein each R is independently selected from lower alkyl radicals containing from 1 to about 4 carbon atoms, and X is a cycloalkylidene radical containing from 8 to about 16 ring carbon atoms.

The more preferred linear polycarbonates containing at least one repeating structural unit of Formula IIa are those containing at least one recurring structural unit represented by the general formula

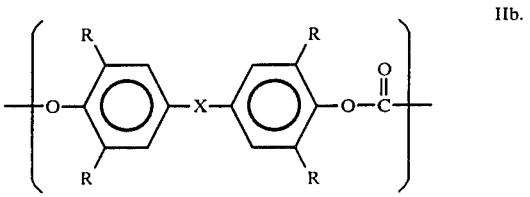

wherein each R is independently selected from lower alkyl radicals and X is a cycloalkylidene radical containing from 8 to about 16 ring carbon atoms. These more preferred polycarbonates are derived from dihydric phenols represented by the general formula

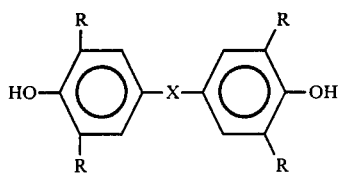

wherein R and X are as defined hereinafore for Formula IIb.

Preferred polycarbonates of Formulae II–IIb are those wherein X is a cycloalkylidene radical containing from 10 to about 16 ring carbon atoms. These polycarbonates are derived from dihydric phenols of Formulae Ia–Ic, respectively, wherein X is a cycloalkylidene radical containing from 10 to about 16 ring carbon atoms. The more preferred polycarbonates of Formulae II–IIb are those wherein X is a monocyclic cycloalkylidene radical containing from 11 to about 16 ring carbon atoms. These more preferred polycarbonates are derived from dihydric phenols of Formulae Ia–Ic, respectively, wherein X is a cycloalkylidene radical containing from 11 to about 16 ring carbon atoms. The most preferred polycarbonates containing at least one repeating structural unit of Formulae II–IIb are those wherein X is a cycloalkylidene radical containing from 12 to 16 ring carbon atoms. These most preferred polycarbonates are derived from dihydric phenols of Formulae Ia–Ic, respectively, wherein X is a cycloalkylidene radical containing from 12 to 16 ring carbon atoms.

Some illustrative non-limiting examples of dihydric phenols of Formula Ic include:

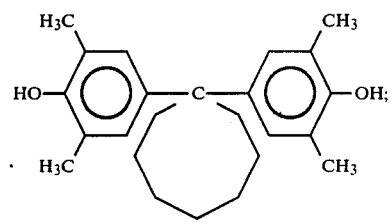

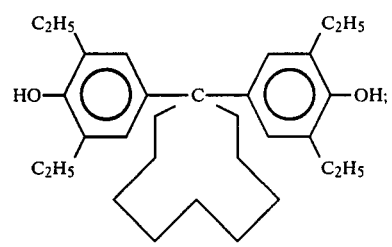

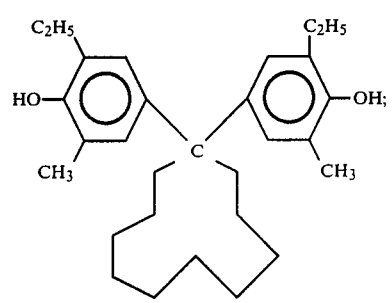

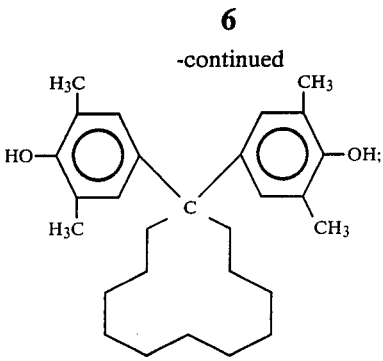

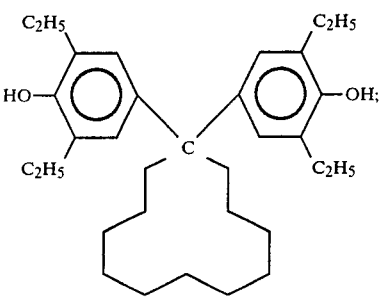

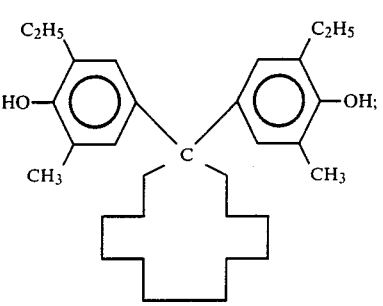

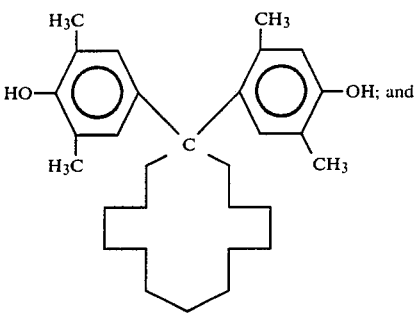

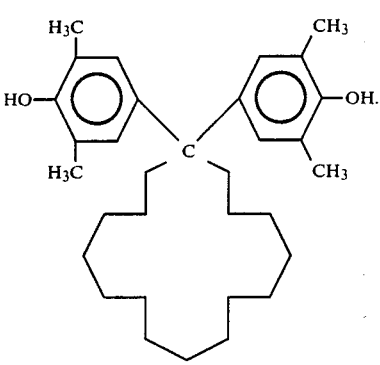

The novel dihydric phenols of Formula I, and particularly those of Formulae Ia and Ib, are prepared by the reaction of a particular ketone with a phenol in the presence of an acid catalyst, preferably in the presence of an acid catalyst and a cocatalyst such as butyl mercaptan.

The particular ketone reactant is selected from ketones represented by the general formula

   III.

wherein $R^1$, m and X are as defined hereinafore. More particularly, the ketone of Formula III may be represented by the general formula

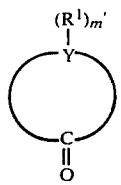   IV.

wherein $R^1$ is as defined hereinafore, Y is selected from alkylene radicals containing from 7 to about 15 carbon atoms which together with the

radical form a cyclic structure containing from 8 to about 16 ring carbon atoms, and m' represents a whole number having a value of from 0 up to the number of replaceable hydrogen atoms present on Y.

The phenol reactants are selected from phenols represented by the general formula

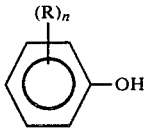   V.

wherein R and n are as defined hereinafore.

The preferred phenol reactants of Formula V, from the standpoint of providing dihydric phenols which yield polycarbonates exhibiting particularly good heat resistance, are those wherein n is two and R is independently selected from lower alkyl radicals.

In order to obtain the novel dihydric phenols of Formula I one mole of the ketone of Formula IV is reacted with two moles of the phenol of Formula V in the presence of an acid catalyst, and preferably in the presence of an acid catalyst and a cocatalyst such as butyl mercaptan. Generally, the phenol reactant is present in excess. Rather than utilizing only one phenol reactant a mixture of two different phenol reactants may be employed.

Some illustrative non-limiting examples of suitable acid catalysts that may be employed include hydrochloric acid, hydrobromic acid, poly(styrene sulfonic acid), sulfuric acid, benzene sulfonic acid, and the like. The phenol of Formula V is reacted with the ketone of Formula IV under conditions of temperature and pressure, and in the presence of the acid catalyst, such that coreaction between said phenol and said ketone will occur to form the dihydric phenol of Formula I. Generally, the reaction proceeds satisfactorily at about one atmosphere of pressure and at temperatures of from about room temperature (25° C.) to about 100° C.

The amount of the acid catalyst employed is a catalytic amount. By catalytic amount is meant an amount effective to catalyze the reaction between the ketone and the phenol to produce the dihydric phenol. Generally, this amount is in the range of from about 0.1 to about 10 percent. However, in actual practice it is usually somewhat higher since the water coproduct formed in the reaction dilutes the acid catalyst and renders it somewhat less effective (slowing the reaction) than in its undiluted state.

In the preparation of the carbonate polymers of the instant invention only one dihydric phenol of Formula I may be employed, or a mixture of two or more different dihydric phenols of Formula I may be used.

The carbonate precursor that is reacted with the dihydric phenol of Formula I may be a carbonyl halide, a diaryl carbonate, or a bishaloformate. The preferred carbonate precursors are the carbonyl halides. The carbonyl halides are selected from carbonyl chloride, carbonyl bromide, and mixtures thereof. The preferred carbonyl halide is carbonyl chloride, also known as phosgene.

The novel linear carbonate polymers of the instant invention contain at least one repeating strutural unit represented by the general formula

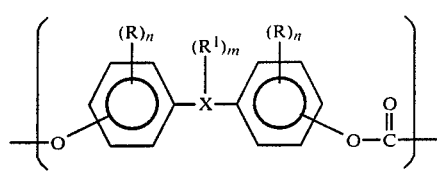   II.

wherein X, $R^1$ and m are as defined hereinafore, and R is independently selected from lower alkyl radicals, and n is two.

In order for the polycarbonates of the instant invention to exhibit particularly high heat resistances it is critical that each n be two, i.e., that the polycarbonates be tetra-alkyl substituted polycarbonates. Thus, for example, if both n's are one, the dialkyl substituted polycarbonate exhibits inferior heat resistance as compared with a tetra-alkyl substituted polycarbonate. Likewise, if one n is zero, and the other n is one, the mono-alkyl substituted polycarbonate likewise exhibits a heat resistance which is inferior than that of a comparable tetra-alkyl substituted polycarbonate.

It is likewise important that R in Formula II be selected from a lower alkyl radical.

These high molecular weight aromatic carbonate polymers generally have a number average molecular weight in the range of from about 5,000 to about 200,000, preferably in the range of from about 10,000 to about 100,000.

Also included herein are the thermoplastic randomly branched polycarbonates. These randomly branched polycarbonates may be prepared by coreacting (i) a carbonate precursor, (ii) at least one dihydric phenol of Formula I, and (iii) a minor amount of a polyfunctional organic compound. The polyfunctional organic compound is generally aromatic in nature and functions as a branching agent. This polyfunctional aromatic compound contains at least three functional groups selected from hydroxyl, carboxyl, haloformyl, carboxylic anhydride, and the like. Some typical polyfunctional aromatic compounds are disclosed in U.S. Pat. Nos. 3,635,895 and 4,001,184, which are hereby incorporated herein by reference. Some illustrative non-limiting examples of these polyfunctional aromatic compounds include trimellitic anhydride, trimellitic acid, trimellityl trichloride, mellitic acid, and the like.

One method of preparing the high molecular weight aromatic carbonate polymers of the instant invention involves the heterogeneous interfacial polymerization system utilizing an aqueous caustic solution, an organic water immiscible solvent such as methylene chloride, at least one dihydric phenol represented by the general Formula I, a carbonate precursor such as phosgene, a catalyst, and a molecular weight regulator.

Another useful method for preparing the linear carbonate polymer of the instant invention involves the use of an organic solvent system, such as pyridine, wherein said organic solvent system may also function as an acid acceptor, at least one dihydric phenol represented by Formula I, a molecular weight regulator, a catalyst, and a carbonate precursor such as phosgene.

The catalysts which are employed herein can be any of the suitable catalysts that aid the polymerization reaction of a dihydric phenol with a carbonate precursor such as phosgene to produce a polycarbonate. Suitable catalysts include, but are not limited to, tertiary amines such as triethylamine, quaternary ammonium compounds, and quaternary phosphonium compounds.

The molecular weight regulators employed can be any of the known compounds which regulate the molecular weight of the carbonate polymer by a chain terminating mechanism. These compounds include, but are not limited to, phenol, tertiary butyl phenol, chromanI, and the like.

The temperature at which the phosgenation reaction proceeds may vary from below 0° C. to above 100° C. The reaction proceeds satisfactorily at temperatures from room temperature (25° C.) to about 50° C. Since the reaction is exothermic, the rate of phosgene addition or the use of a low boiling solvent such as methylene chloride may be used to control the reaction temperature.

The carbonate polymers of the instant invention may optionally have admixed therewith certain commonly known and used additives such as antioxidants; antistatic agents; fillers such as glass fibers, mica, talc, clay, and the like; impact modifiers; ultraviolet radiation absorbers such as the benzophenones, benzotriazoles, cyanoacrylates, and the like; plasticizers; hydrolytic stabilizers such as the epoxides disclosed in U.S. Pat. Nos. 3,489,716, 4,138,379 and 3,839,247, all of which are hereby incorporated herein by reference; color stabilizers such as the organophosphites disclosed in U.S. Pat. Nos. 3,305,520 and 4,118,730, both of which are hereby incorporated herein by reference; flame retardants; and the like.

Some particularly useful flame retardants include the alkali and alkaline earth metal salts of sulfonic acids. These types of flame retardants are disclosed, inter alia, in U.S. Pat. Nos. 3,775,367; 3,836,490; 3,933,374; 3,948,851; 3,926,908; 3,919,167; 3,909,490; 3,953,396; 3,831,100; 3,978,024; 3,953,399; 3,917,559; 3,951,810 and 3,940,366, all of which are incorporated herein by reference.

Another embodiment of the instant invention is a flame retardant polycarbonate composition comprising, in physical admixture:

(i) at least one polycarbonate resin containing at least one recurring structural unit of Formula II, and preferably of Formula IIa; and (ii) a flame retardant amount of at least one flame retardant compound, preferably one selected from the alkali and alkaline earth metal salts of organic sulfonic acids.

The alkali and alkaline earth metal salts of organic sulfonic acids useful in the instant compositions include, but are not limited to:

(A) alkali and alkaline earth metal salts of substituted and unsubstituted sulfonic acids of aromatic sulfides;

(B) alkali and alkaline earth metal salts of halocycloaliphatic aromatic sulfonic acids;

(C) alkali and alkaline earth metal salts of sulfonic acids of heterocyclic compounds;

(D) alkali and alkaline earth metal salts of substituted and unsubstituted sulfonic acids of aromatic ketones;

(E) alkali and alkaline earth metal salts of monomeric or polymeric aromatic sulfonic acids;

(F) alkali and alkaline earth metal salts of monomeric or polymeric substituted aromatic sulfonic acids:

(G) alkali and alkaline earth metal salts of monomeric or polymeric aromatic amide sulfonic acids;

(H) alkali and alkaline earth metal salts of sulfonic acids of aromatic ethers;

(I) alkali and alkaline earth metal salts of monomeric or polymeric sulfonic acids of aromatic carboxylic acids;

(J) alkali and alkaline earth metal salts of monomeric or polymeric phenol esters of sulfonic acids; and (K) alkali salts of perfluoroalkane sulfonic acids.

The alkali and alkaline earth metal salts of substituted and unsubstituted sulfonic acids of aromatic sulfides are disclosed in U.S. Pat. No. 3,909,490. These salts may be represented by the formula

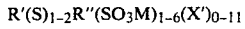
$$R'(S)_{1-2}R''(SO_3M)_{1-6}(X')_{0-11}$$

wherein:

X' is an electron withdrawing radical;

M is a metal selected from the alkali and alkaline earth metals; and

R' and R'' may be either an aryl radical of 1-2 aromatic rings or an aliphatic radical of 1-6 carbon atoms, and they may be the same or different, with the proviso that R' and R'' together must contain at least one aromatic ring. Illustrative of these compounds is sodium 4,4'-dichloro-diphenylsulfide-3-sulfonate.

The alkali and alkaline earth metal salts of halocycloaliphatic aromatic sulfonic acids (B) are disclosed in U.S. Pat. No. 3,917,559. These salts are substituted aromatic sulfonic acid salts wherein the substituent consists of a thermally stable, halogenated cycloaliphatic radical. These salts can best be represented by the formula

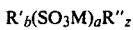
$$R'_b(SO_3M)_aR''_z$$

wherein:

R' is a halogenated cycloaliphatic radical;

R'' is an aryl radical of 1-4 aromatic rings;

M is a metal which may be selected from the periodic table of either an alkali metal or an alkaline earth metal;

b is an integer of 1-2;

a is an integer of 1-6; and z is an integer 1-2.

The preferred compound represented by this formula is sodium 4'[1,4,5,6,7,7-hexachlorobicyclo-(2.2.1)-hept-5-en-endo-2-yl]benzenesulfonate.

The alkali and alkaline earth metal salts of sulfonic acids of heterocyclic compounds (C) are disclosed in U.S. Pat. No. 3,919,167. These salts can best be represented by the general formula $$X'_{0-15}R'(SO_3M)_{1-6}$$

wherein:
X' is an electron withdrawing radical;
M is a metal which may be selected from the periodic table or either an alkali metal or an alkaline earth metal; and
R' is an organic nucleus selected from the group of organic heterocyclic nuclei consisting of

 (i)

wherein Z is selected from the hetero atoms consisting of sulfur, oxygen and nitrogen,

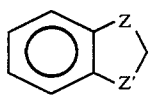 (ii)

wherein Z and Z' are independently selected from the group consisting of carbon and the hetero atoms nitrogen, sulfur and oxygen, providing that at least one of Z or Z' is a hetero atom,

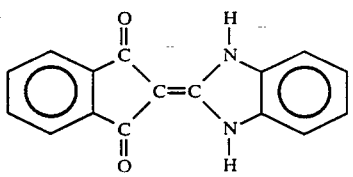 (iii)

phthalocyanine, (iv)

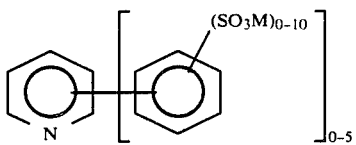 (v)

and

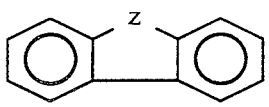 (vi)

wherein Z is selected form the hetero atoms nitrogen, oxygen and sulfur. The preferred compound represented by this formula is the sodium salt of 2,5-dichlorothiophene-3-sulfonic acid.

The alkali and alkaline earth metal salts of sulfonic acids of aromatic ketones (D) are disclosed in U.S. Pat. No. 3,926,908. These salts may be represented by the general formula $$R'(CO)_{1-2}R''(SO_3M)_{1-8}(X')_{0-11}$$

wherein:
X' is an electron withdrawing radical;
M is a metal which may be selected from the periodic table of either an alkali metal or an alkaline earth metal; and
R' and R'' are independently selected from aryl radicals of 1-2 aromatic rings and aliphatic radicals of 1-6 carbon atoms, provided, however, that R' and R'' must contain at least one aromatic radical. The preferred compound represented by this formula is the salt of 4,4'-dichlorobenzophenone-3,3'-disulfonate.

The alkali and alkaline earth metal salts of monomeric or polymeric aromatic sulfonic acids (E) are disclosed in U.S. Pat. No. 3,933,734. These alkali and alkaline earth metal salts of the monomeric sulfonates may be represented by the general formula $$[A]_{0-1}[R']_{0-2}[B]$$

wherein:
A and B can, in turn, be independently selected from compounds represented by the formula $$(SO_3M)_y R'$$

where
R' is an aryl radical of 1-4 aromatic rings and y is an integer of 0-10, provided that the sum of y is at least one, and M is a metal selected from alkali metals and alkaline earth metals; and
R' is an organic radical of 1-20 carbon atoms selected from alkyl, aralkyl, alkaryl, aralkenyl, alkylene, alkylidene, aralkylidene, alkenylidene and aralkenylidene radicals.

The preferred monomeric aromatic sulfonate salt is disodium naphthalene-2,6-disulfonate.

The alkali and alkaline earth metal salts of polymeric aromatic sulfonates may be represented by the general formula $$[A]_a[R_1]_{a+b}[B]_b$$

wherein:
A and B are independently selected from compounds represented by the general formula $$(SO_3M)_y R'$$

where M is a alkali or alkaline earth metal, y is an integer having a value of from 0 to 10, provided that the sum of y must equal at least one, and R' is an aryl radical of 1-4 aromatic rings;
$R_1$ is an organic radical of 1-20 carbon atoms selected from arylene, alkylene, aralkylene, alkenylene, aralkenylene, alkylidene, aralkylidene, alkenylidene and aralkenylidene radicals; and
the sum of a and b must be at least 4 and can be as high as 400.

The alkali and alkaline earth metal salts of monomeric or polymeric substituted aromatic sulfonic acids (F) are disclosed in U.S. Pat. No. 3,940,366. The alkali and alkaline earth metal salts of the monomeric aromatic sulfonic acids may be represented by the general formula $[A]_{0-1}[R']_{0-1}[B]$ wherein:

A and B are independently selected from compounds represented by the general formula

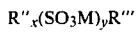
$R''_x(SO_3M)_yR'''$ where R" is an electron withdrawing radical, M is an alkali or alkaline earth metal, R''' is an aryl radical of 1-4 aromatic rings, x is an integer of 0-17, and y is an integer of 0-10, with the proviso that the sum of x must equal at least one and the sum of y must equal at least one; and R' is an organic radical of 1-20 carbon atoms selected from alkyl, aryl, aralkyl, alkenyl, aralkenyl, aryl arylene, alkylene, aralkylene, alkenylene, aralkenylene, alkylidene, aralkylidene, alkenylidene and aralkenylidene radicals. The preferred salt of the aromatic sulfonic acids of this formula is the sodium salt of 2,4,5-trichlororbenzenesulfonic acid.

The alkali and alkaline earth metal salts of the polymeric substituted aromatic sulfonic acids may be represented by the general formula

$[A]_a[R_1]_{a+b}[B]_b$ wherein:

A and B are independently selected from compounds represented by the general formula
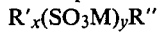
$R'_x(SO_3M)_yR''$ where R' is an electron withdrawing group, M is an alkali or alkaline earth metal, R" is an aryl radical of 1-4 aromatic rings, x is an integer of 0-17, and y is an integer of 0-10, with the proviso that the sum of x must equal at least one and that the sum of y must equal at least one;

$R_1$ is an organic radical of 1-20 carbon atoms and is selected from arylene, alkylene, aralkylene, alkenylene, aralkenylene, alkylidene, aralkylidene, alkenylidene, and aralkenylidene radicals; and the sum of a and b must be at least 4 and can be as high as 2,000, the selection of a and b can be random or equal or one can be zero.

The alkali and alkaline earth metal salts of monomeric or polymeric aromatic amide sulfonic acids (G) are disclosed in U.S. Pat. No. 3,951,910. The alkali and alkaline earth metal salts of monomeric amide sulfonic acids may be represented by the general formula $[R']_z[NBB']_v[NDD']_w[OA]_t[X']_y[Hal]_u[SO_3M]_s$ wherein:

N is nitrogen;

O is oxygen;

R', B, B', D, D', and A are organic radicals independently selected from aliphatic and cycloaliphatic radicals of 1-20 carbon atoms and aryl radicals of 1-4 aromatic rings, provided that this formula contains at least one aromatic ring to which the [SO$_3$M] substituent is attached, B, B', D and D' may also independently be hydrogen;

X' is a di- or trivalent radical selected from the following:

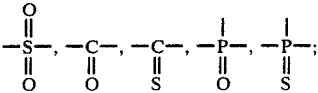

Hal is a halogen selected from fluorine, chlorine and bromine;

M is an alkali or alkaline earth metal;

z and t are integers of 0-2, and v and w are integers having a value of from 0-4, provided that the sum of the integers z, t, v, and w is at least one;

y is an integer of from 1-4;

s is an integer of from 1-8; and u is an integer of from 0-10.

The preferred salt of these monomeric amide sulfonic acids is the sodium salt of 2,4,5-trichlorobenzenesulfonanilide-4'-sulfonate.

The alkali and alkaline earth metal salts of the polymeric aromatic amide sulfonic acids may be represented by the general formula

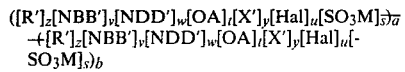
$([R']_z[NBB']_v[NDD']_w[OA]_t[X']_y[Hal]_u[SO_3M]_s)_a$
$+([R']_z[NBB']_v[NDD']_w[OA]_t[X']_y[Hal]_u[SO_3M]_s)_b$ wherein:

N, O, B, B', D, D', X', M, Hal, t, u, v, w, y and z have the same meaning as specified hereinafore for the aromatic amide sulfonic acids;

a and b are integers from 2 to 300; and s is an integer from 0-8, provided that the sum of s is at least one.

The alkali and alkaline earth metal salts of sulfonic acids of aromatic ethers (H) are disclosed in U.S. Pat. No. 3,953,396. These salts may be the salts of either monomeric or polymeric aromatic ether sulfonic acids.

The alkali and alkaline earth metal salts of monomeric aromatic ether sulfonic acids may be represented by the general formula

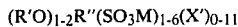
$(R'O)_{1-2}R''(SO_3M)_{1-6}(X')_{0-11}$ wherein:

X' is an electron withdrawing radical;

M is an alkali or alkaline earth metal;

R' and R" are independently selected from aryl radicals of from 1-2 aromatic rings and aliphatic radicals containing from 1-6 carbon atoms, with the proviso that R' and R" together must contain at least one aromatic ring. The preferred salt of these monomeric aromatic ether sulfonic acids is disodium tetrachlorodiphenyletherdisulfonate.

The alkali and alkaline earth metals salts of polymeric ether sulfonic acids may be represented by the general formula

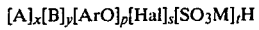
$[A]_x[B]_y[ArO]_p[Hal]_s[SO_3M]_tH$ wherein:

Ar is a phenylene radical;

O is oxygen;

A is an alkyl radical containing from 1 to 4 carbon atoms;

B is a phenyl radical;

Hal is a halogen selected from fluorine, chlorine and bromine;

M is an alkali or alkaline earth metal;

p is an integer of from 2 to 300;

x, y and s are independently selected from integers having a value of from 0 to 600; and t is an integer of from 1 to 600.

The preferred salt of the polymeric aromatic ether sulfonic acids is polysodium poly(2,6-dimethylphenyleneoxide)polysulfonate.

The alkali and alkaline earth metal salts of sulfonic acids of monomeric and polymeric aromatic carboxylic acids and esters (I) are disclosed in U.S. Pat. No. 3,953,399. The alkali and alkaline earth metal salts of the unsubstituted and substituted sulfonic acids of monomeric aromatic carboxylic acids and esters may be represented by the general formula

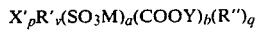

wherein:

X′ is an electron withdrawing radical;

M is an alkali or alkaline earth metal;

R′ is an aryl radical of 1–4 aromatic rings;

R″ is an organic radical containing 1 to 4 carbon atoms selected from alkyl, alkenyl, alkylene, alkenylene, alkylidene, and alkenylidene radicals;

Y is an alkali or alkaline earth metal or an organic radical containing from 1 to 20 carbon atoms selected from alkyl, cycloalkyl, aralkyl, alkenyl, cycloalkenyl, aralkenyl, and aryl radicals;

a and b are independently selected from integers having a value of from 1 to 6;

p and q are independently selected from integers having a value of from 0 to 10; and v is an integer having a value of from 1–10.

The preferred monomeric salt of this type is sodium dimethyl 2,4,6-trichloro-5- sulfoisophthalate.

The polymeric form of the sulfonic acid salts of unsubstituted and substituted aromatic carboxylic acids and esters may be represented by the general formula

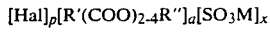

wherein:

Hal is a halogen radical selected from fluorine, chlorine and bromine;

R′ and R″ are either aromatic nuclei of 1–4 aromatic rings or aliphatic and cycloaliphatic radicals of from 2–20 carbon atoms, provided that either R′ or R″ must be aromatic;

M is an alkali or alkaline earth metal;

a is an integer having a value of from 2 to 300;

x is an integer having a value of from 1 to 600; and p is an integer having a value of from 0 to 600.

The preferred polymeric salts of this type are polysodium polyethyleneterephthalate polysulfonate, polysodium polybutylene-2,5-dibromoterephthalate polysulfonate; and polysodium polybutyleneterephthalate polysulfonate.

The alkali and alkaline earth metal salts of monomeric and polymeric phenol esters of sulfonic acids (J) are disclosed in U.S. Pat. No. 3,978,024. The alkali and alkaline earth metal salts of monomeric phenol ester sulfonic acids may be represented by the general formula

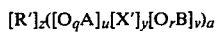

wherein:

A and B are independently selected from compounds represented by the general formula

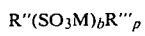

where R″ is an aromatic radical of 1–4 aromatic nuclei, M is an alkali or alkaline earth metal, R‴ is an electron withdrawing group, b is an integer having a value of from 0 to 4, and p is an integer having a value of from 0 to 10, provided that the sum of a and p must be at least one;

R′ is an organic radical containing from 1 to 20 carbon atoms and is selected from alkyl, aralkyl, alkenyl, aralkenyl, aryl, arylene, alkylene, aralkylene, alkylidene, aralkylidene, alkenylidene, aralkenylidene, A, and B radicals;

A is selected from

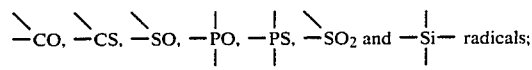

z is an integer having a value of from 0 to 3;

y is an integer having a value of from 1 to 2;

a is an integer having a value of from 1 to 4;

q and r are independently selected from integers having a value of from 1 to 4;

v is an integer having a value of from 0 to 4; and

O is oxygen.

The preferred salt of monomeric phenol ester sulfonic acid is the sodium salt of the sulfonic acid of dichlorophenyl 2,4,5-trichlorobenzenesulfonate.

The alkali and alkaline earth metal salts of polymeric phenol ester sulfonic acids may be represented by the general formula

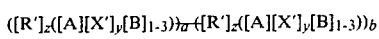

wherein:

A and B are independently selected from compounds represented by the general formula

where O, R″, M, R‴, b, p, q, R′, X′, Z and y have the same meanings as set forth hereinafore;

a is an integer of from 0–2,000, and b is an integer of from 0–2,000, provided that the sum of a and b is at least 4 and can be as high as 2,000.

Particularly useful flame retardant additives may be represented by the following general formulae:

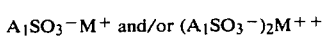

wherein $A_1$ is an aromatic monomeric or polymeric radical, $M^+$ is an alkali metal ion and $M^{++}$ is an alkaline earth metal ion. The aromatic radical may be substituted or unsubstituted and should contain at least 6 carbon atoms. The preferred substituents are electron withdrawing radicals such as halo- trihalomethyl or cyano, preferably halo- selected from chlorine, bromine or fluorine. Preferably $A_1$ is selected from:

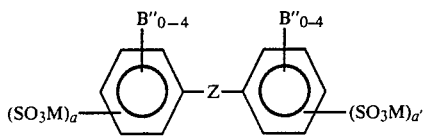

or

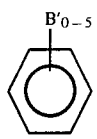

wherein Z is selected from a direct bond, O, CO, S, SO$_2$ or OSO$_2$, and B' and B" are independently chlorine, bromine, fluorine, trihalomethyl, cyano, nitro, or aliphatic groups (e.g., methyl, ethyl, propyl, etc.).

Other particularly useful flame retardant salts include those represented by the general formulae

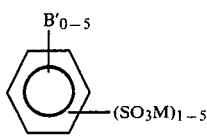

or

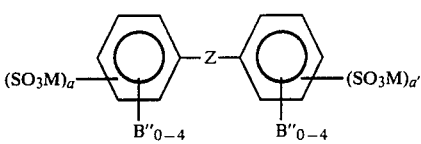

wherein M, B', B" and Z are as previously defined, and a and a' are independently 0–4, with the proviso that at least one of a or a' is one.

The instant flame retardant salts are present in the instant polycarbonate compositions in a flame retardant amount. By flame retardant amount is meant an amount effective to render said compositions flame retardant. Generally this amount is in the range of from about 0.01 to about 10 parts of the salt per hundred parts of the rsin, preferably from about 0.1 to about 5 parts of the salt per hundred parts of the resin.

Conventional well known flame retardants other than the aforementioned salts may also be employed in the practice of this embodiment. These conventional flame retardant additives generally contain a halogen, preferably chlorine and/or bromine. That is to say, they are a halogen source. They may be inorganic or organic. Typical of the inorganic halogen sources are NaCl, KBr, etc. The organic halogen sources are preferably aromatic and may be monomers or polymers. Typical aromatic monomers include the halodiphenyl ethers such as tetrabromodiphenyl ether, etc. Typical aromatic polymers include those derived from halogenated bisphenols such as, for example, a polycarbonate derived from tetrabromo bipshenol-A. These flame retardant additives are present in the instant compositions in a flame retardant amount. By flame retardant amount is meant an amount effective to render said compositions flame retardant. Generally this amount is such as to provide a composition having a halogen content of from about 0.01 to about 10 weight percent, based on the total composition, preferably from about 0.1 to about 5 weight percent.

Still another embodiment is an impact modified polycarbonate composition comprised of, in admixture:

(i) at least one polycarbonate containing at least one recurring structural unit of Formula II, and preferably of Formula IIa; and (ii) an impact modifier composition comprising an impact modifier which improves the impact properties of said polycarbonate, said impact modifier composition present in quantities which are effective to improve the impact properties of said polycarbonate composition.

Generally, any material known to impact modify aromatic polycarbonates should be useful in upgrading the impact properties of the polycarbonates of this invention. Examples of these impact modifiers include but are not limited to the following general categories:

polyacrylates;
polyolefins;
rubbery dienic polymers; and
styrenic polymers.

The polyacrylates which may be employed as impact modifiers are rubbery homopolymers or copolymers. In general the polyalkyl acrylates described in Brinkman et al., U.S. Pat. No. 3,591,659, incorporated herein by reference, can be used, especially those containing units derived from alkyl acrylates, particularly n-butyl acrylate. Acrylate containing copolymers wherein the other monomer is, for example, derived from a methacrylate are also readily employable, see for example Japanese Patent Application Announcement 1968-18611, incorporated herein by reference. Preferably the acrylate resin will be in the form of a rubber-elastic graft copolymer having a glass transition temperature below about $-20°$ C., preferably below about $-40°$ C. Schlichting, U.S. Pat. No. 4,022,748, incorporated herein by reference. More preferably, the acrylate resin will comprise a multiple stage polymer having a rubbery first stage (core) and a thermoplastic hard final stage (shell), see Farnham U.S. Pat. No. 4,096,202, incorporated herein by reference.

The most preferred acrylate resin is a multiphase composite interpolymer comprised of a $C_1$–$C_5$ acrylate and a $C_{1-5}$ methacrylate. These interpolymers consist of about 25 to 95 weight percent of a first elastomeric phase polymerized from a monomer system comprising about 75 to 99.8 weight percent of a $C_{1-5}$ alkyl acrylate, 0.1 to 5 percent by weight cross linking monomer, 0.1 to 5 percent by weight of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizes at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are alkyl group-containing monomers of alkyl esters of ethylenically unsaturated acids such as allyl acrylate, allyl methacrylate, diallyl maleate, diallyl fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate. The multiphase composite interpolymer Acryloid KM-330 available from Rohm and Haas is preferred. This interpolymer is comprised of small quantities of cross linking and graft monomers, about 80 weight percent n-butyl acrylate and about 20 weight percent methyl methacrylate.

The polyolefins which can be employed as impact modifiers are homopolymers or copolymers. Examples of the homopolymers include polyethylene, polypropylene, polybutene-1, polyhexene and the like. The polymers include the standard high density polymers, low density polymers as well as the new linear low density polyolefins such as the linear low density polyethylene made with butene-1 or octene-1. Other examples of copolymers containing at least one olefin monomer can be employed. For example, copolymers of ethylene and propylene can be employed as the impact modifier as well as a copolymer of an olefin and an acrylate such as ethylene ethyl acrylate, a copolymer available from Union Carbide as DPD-6169. Other higher olefin monomers can be employed as copolymers with alkyl acrylates, for example propylene and n-butyl acrylate and the like. These polyolefin polymers can also be reacted with rubbery dienes so as to form terpolymers of the EPDM family such as ethylene propylene diene terpolymers, for example Epsyn 704 available from Copolymer Rubber.

Various rubbery polymers can also be employed as impact modifiers. Examples of such rubbery polymers include polybutadiene, polyisoprene, styrene-butadiene and various other copolymers having a rubbery dienic comonomer.

Styrene containing polymers can also be employed as impact modifiers. Examples of such polymers include acrylonitrile-butadiene-styrene, styrene acrylonitrile, acrylonitrile-butadiene-alpha-methylstyrene, methacrylate-butadiene-styrene and other high impact styrene containing polymers.

Other known impact modifiers include various elastomeric materials such as organic silicone rubbers, organic silicone polysiloxane polymers, elastomeric fluorohydrocarbons, elastomeric polyesters, polysiloxane-polycarbonate copolymers, etc.

Generally any minimum quantity of impact modifier which positively upgrades the impact strength of the polycarbonates of the instant invention can be employed. Greater than this minimum quantity may be employed as long as the properties desired for a particular application of the polycarbonate are substantially maintained. Generally, a minimum of about two weight percent is sufficient to observe an increase in the impact strength. A minimum of about four weight percent of the impact modifier, based on the amount of impact modifier and polycarbonate resin present, is preferred. A level of about fifteen weight percent should generally not be exceeded, preferably about ten weight percent. Weight percent is measured as the amount of impact modifier in the total of impact modifier plus the aromatic polycarbonate resin of this invention.

The compositions of this embodiment may be compounded in the usual manner, for example blending the resin with the impact modifier in a dry form, for example powder or granules and the like and then extruding the composition.

Another embodiment of the instant invention is a carbonate polymer obtained by reacting (i) a carbonate precursor, (ii) at least one dihydric phenol of Formula Ia, and preferably Ib, and (iii) at least one dihydric phenol represented by the general formula

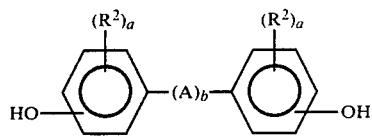

wherein:
$R^2$ is independently selected from halogen radicals, monovalent hydrocarbon radicals, and monovalent hydrocarbonoxy radicals;
a is independently selected from whole numbers having a value of from 0 to 4 inclusive;
b is either zero or one; and
A is selected from alkylene radicals, alkylidene radicals, cycloalkylene and cycloalkylidene radicals containing from 4 to 6 ring carbon atoms,

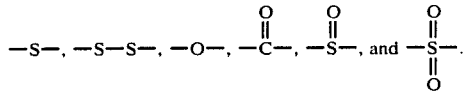

The preferred halogen radicals represented by $R^2$ are chlorine and bromine.

The monovalent hydrocarbon radicals represented by $R^2$ are the alkyl radicals, the aryl radicals, the aralkyl radicals, the alkaryl radicals, and the cycloalkyl radicals. The preferred alkyl radicals represented by $R^2$ are those containing from 1 to about 8 carbon atoms. Some illustrative non-limiting examples of these alkyl radicals include methyl, ethyl, propyl, isopropyl, butyl, isobutyl, tertiary butyl, pentyl, neopentyl, and the like. The preferred aryl radicals represented by $R^2$ are those containing from 6 to 12 carbon atoms, i.e., phenyl, naphthyl, and biphenyl. The preferred aralkyl radicals and alkaryl radicals represented by $R^2$ are those containing from 7 to about 14 carbon atoms. Some illustrative non-limiting examples of these aralkyl and alkaryl radicals include benzyl, tolyl, ethylphenyl, and the like. The preferred cycloalkyl radicals represented by $R^2$ are those containing from 4 to about 6 ring carbon atoms and include cyclobutyl, cyclopentyl, cyclohexyl, methylcyclohexyl, and the like.

The monovalent hydrocarbonoxy radicals represented by $R^2$ are preferably selected from alkoxy radicals and aryloxy radicals. The preferred alkoxy radicals represented by $R^2$ are those containing from 1 to about 8 carbon atoms. Some illustrative non-limiting examples of these alkoxy radicals include methoxy, butoxy, isopropxy, propoxy, and the like. The preferred aryloxy radical is phenoxy.

Preferably $R^2$ is independently selected from monovalent hydrocarbon radicals, with the alkyl radicals being the preferred monovalent hydrocarbon radicals.

The preferred alkylene radicals represented by A are those containing from 2 to about 6 carbon atoms. Some illustrative non-limiting examples of these alkylene radicals include ethylene, propylene, butylene, and the like. The preferred alkylidene radicals represented by A are those containing from 1 to about 6 carbon atoms. Some illustrative nonlimiting examples of these alkylidene radicals include ethylidene, 1,1-propylidene, 2,2-propylidene, and the like.

The preferred dihydric phenols of Formula VI are those wherein b is one and A is selected from alkylene or alkylidene radicals.

In the dihydric phenol of Formula VI when more than one $R^2$ substituent is present on the aromatic nuclear residue they may be the same or different.

The more preferred dihydric phenols of Formula VI are the 4,4'-bisphenols.

The dihydric phenols of Formula VI are well known in the art and are generally commercially available or may be readily prepared by known methods. These phenols are generally used in preparing conventional prior art polycarbonate resins.

Some non-limiting illustrative examples of the dihydric phenols of Formula VI include:
2,2-bis(4-hydroxyphenyl)propane (bisphenol-A);
1,1-bis(3-methyl-4-hydroxyphenyl)ethane;
2,2-bis(3,5-dimethyl-4-hydroxyphenyl)propane;
2,2-bis(3,5-dibromo-4-hydroxyphenyl)propane;
bis(4-hydroxyphenyl)sulfide;
3,3-bis(3-methyl-4-hydroxyphenyl)pentane;
3,3'-diethyl-4,4'-dihydroxydiphenyl; and the like.

The amount of the dihydric phenol of Formula Ia utilized in this embodiment is an amount effective to improve the heat resistance, e.g., glass transition temperature, of the copolymers. Generally, this amount is in the range of from about 5 to about 90 weight percent, and preferably from about 10 to about 80 weight percent, based on the total amount of the dihydric phenols of Formulae Ia and VI employed.

The preferred dihydric phenol of Formula VI is 2,2-bis(4-hydroxyphenyl)propane.

The carbonate copolymers obtained by reacting (i) a carbonate precursor, (i) at least one dihydric phenol of Formula Ia, and (ii) at least one dihydric phenol of Formula VI will contain at least the following repeating structural units:
II; and

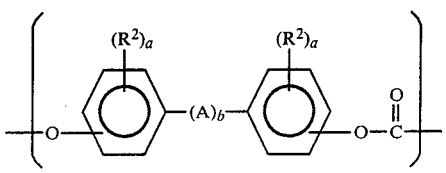

In the practice of this embodiment of the instant invention only one dihydric phenol of Formula VI may be employed or a mixture of two or more different dihydric phenols of Formula VI may be utilized.

The procedures for preparing the copolymers of this embodiment are generally similar to those used for producing the polycarbonates of the instant invention as described hereinafore. The instant carbonate copolymers may optionally have admixed therewith the various additives described hereinafore; particularly a flame retardant amount of at least one flame retardant additive selected from the alkali and alkaline earth metal salts of sulfonic acids, and an impact modifying amount of at least one impact modifier of the type described hereinafore.

Yet another embodiment of the instant invention is a polycarbonate resin blend comprised of (i) at least one polycarbonate resin derived from (a) at least one dihydric phenol of Formula Ia, and preferably of Formula Ib, and (b) a carbonate precursor (hereinafter referred to as resin A); and (ii) at least one conventional polycarbonate resin derived from (a) at least one dihydric phenol of Formula VI, and (b) a carbonate precursor (hereinafter referred to as resin B). These blends contain an amount of resin A effective to improve the heat resistance of said blends. Generally, this amount is in the range of from about 5 to about 90 weight percent, preferably from about 10 to about 80 weight percent of resin A, based on the total amount of resins A and B present in the blends.

The blends of the instant invention may optionally contain admixed therewith the aforedescribed additives, particularly a flame retardant amount of at least one flame retardant additive selected from the alkali and alkaline earth metal salts of sulfonic acids, and an impact modifying amount of at least one impact modifier of the type described hereinafore.

The instant blends may generally be prepared by first preforming the resins A and B and thereafter physically mixing or blending these resins together.

Still another embodiment of the instant invention are copolyester-carbonates derived from (i) a carbonate precursor, (ii) at least one dihydric phenol of Formula Ia, and preferably of Formula Ib, and (iii) at least one difunctional carboxylic acid or an ester forming reactive derivative thereof.

Briefly stated, the copolyester-carbonates comprise recurring carbonate groups, carboxylate groups, and aromatic carbocyclic groups in the linear polymer chain, in which at least some of the carboxylate groups and at least some of the carbonate groups are bonded directly to the ring carbon atoms of the aromatic carbocyclic groups.

These copolyester-carbonates contain ester bonds and carbonate bonds in the polymer chain, wherein the amount of ester bonds is in the range of from about 25 to about 90 mole %, preferably from about 35 to about 80 mole %. For example, 5 moles of bisphenol-A reacting completely with 4 moles of isophthaloyl dichloride and .1 mole of phosgene would give a copolyester-carbonate of 80 mole % ester bonds.

Conventional copolyester-carbonates in general, and methods for their preparation, are disclosed in U.S. Pat. No. 3,169,121, which is hereby incorporated by reference.

In general, any difunctional carboxylic acid conventionally used in the preparation of linear polyesters may be utilized in the preparation of the linear copolyester-carbonate resins of the present invention. The carboxylic acids which may be used include the aliphatic carboxylic acids, aliphatic-aromatic carboxylic acids, and aromatic carboxylic acids. These acids are disclosed in the aforementioned U.S. Pat. No. 3,169,121.

The difunctional carboxylic acids which may be utilized in the preparation of the copolyester-carbonate resins of the instant invention generally conform to the general formula

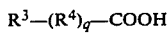   VIII.

wherein $R^4$ is an alkylene, alkylidene, aralkylene, aralkylidene or cycloaliphatic group containing ethylenic unsaturation; an aromatic group such as phenylene, biphenylene, substituted phenylene, and the like; two or more aromatic groups connected through non-aromatic linkages such as alkylene or alkylidene groups; and the like. $R^3$ is either a carboxyl group or a hydroxyl group. The letter q represents one where $R^3$ is a hydroxyl group and either zero or one where $R^3$ is a carboxyl group.

Preferred difunctional carboxylic acids are the aromatic difunctional carboxylic acids, i.e., those acids of Formula VIII where q is one, $R^3$ is a carboxyl or a hydroxyl group, and $R^4$ is an aromatic group such as phenylene, naphthylene, biphenylene, substituted phenylene, and the like. The preferred aromatic difunctional carboxylic acids are those represented by the general formula

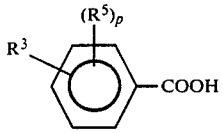   IX.

wherein $R^3$ is as defined above; $R^5$ is independently selected from halogen radicals, monovalent hydrocarbon radicals, and monovalent hydrocarbonoxy radicals; and p represents a whole number having a value of from 0 to 4 inclusive.

The preferred halogen radicals represented by $R^5$ are chlorine and bromine. The monovalent hydrocarbon radicals represented by $R^5$ are selected from alkyl radicals, aryl radicals alkaryl radicals, aralkyl radicals, and cycloalkyl radicals. The preferred alkyl radicals, aryl radicals, alkaryl radicals, aralkyl radicals and cycloalkyl radicals are the same as those defined for R hereinafore. The monovalent hydrocarbonoxy radicals represented by $R^5$ are selected from alkoxy radicals and aryloxy radicals. The preferred alkoxy radicals and aryloxy radicals represented by $R^5$ are the same as those defined by R hereinafore.

Preferred radicals represented by $R^5$ are the monovalent hydrocarbon radicals, with the alkyl radicals being the preferred monovalent hydrocarbon radicals.

Mixtures of two or more different difunctional acids may be employed as well as single individual difunctional carboxylic acids. Therefore, where the term difunctional carboxylic acid is used herein it is meant to include mixtures of two or more different difunctional carboxylic acids as well as single difunctional carboxylic acids.

Particularly useful aromatic difunctional carboxylic acids are isophthalic acid, terephthalic avid, and mixtures thereof. A particularly useful mixture of isophthalic acid and terephthalic acid is one wherein the weight ratio of isophthalic acid to terephthalic acid is in the range of from 1:10 to 9.8:0.2.

Rather than utilizing the difunctional carboxylic acids per se it is preferred to employ their ester forming reactive derivatives such as, for example, the acid halides. Particularly useful acid halides are the acid chlorides. Thus, for example, instead of using isophthalic acid, terephthalic acid, or mixtures thereof it is preferred to utilize isophthaloyl dichloride, terephthaloyl dichloride, or mixtures thereof.

One of the methods for preparing the copolyester-carbonates of the instant invention involves the heterogeneous interfacial polymerization system utilizing an aqueous caustic solution, an organic water immiscible solvent, at least one dihydric phenol represented by Formula Ia, at least one difunctional carboxylic acid or an ester forming reactive derivative thereof, a catalyst, a molecular weight regulator, and a carbonate precursor. A preferred heterogeneous interfacial polymerization system is one which utilizes phosgene as the carbonate precursor and methylene chloride or chlorobenzene as the organic solvent.

The reaction conditions catalysts, and chain terminators or molecular weight regulators utilized are generally the same as these described hereinafore for the preparation of the polycarbonates of the instant invention.

The linear copolyester-carbonate resins of the instant invention may also optionally contain admixed therewith the various additives described supra, particularly a flame retardant amount of at least one flame retardant additive selected from the alkali ·and alkaline earth metal salts of sulfonic acids, and an impact modifying amount of at least one impact modifier described hereinafore.

Another embodiment of the instant invention is a copolyester-carbonate resin derived from (i) a carbonate precursor, (ii) at least one difunctional carboxylic acid or a reactive derivative thereof, (iii) at least one dihydric phenol of Formula Ia, and (iv) at least one dihydric phenol of Formula VI. In this linear copolyester-carbonate resin the amount of the dihydric phenol of Formula Ia employed is an amount effective to improve the heat resistance of the resin. Generally, this amount is in the range of from about 5 to about 90 weight percent, preferably from about 10 to about 80 weight percnt, based on the amount of dihydric phenols of Formulae Ia and VI present.

These resins may also optionally have admixed therewith the aforedescribed additives, particularly a flame retardant amount of at least one flame retardant additive selected from the alkali and alkaline earth metal salts of sulfonic acids, and an impact modifying amount of at least one impact modifier of the type described hereinafore.

Still another embodiment of the instant invention is a copolyester-carbonate resin blend comprised of (i) at least one linear copolyester-carbonate resin of the instant invention, i.e., one derived from (a) a carbonate precursor, (b) at least one difunctional carboxylic acid or a reactive derivative thereof, and (c) at least one dihydric phenol of Formula Ia (hereinafter referred to as copolyester-carbonate resin C); and (ii) at least one conventional copolyester-carbonate resin which is derived from (a) a carbonate precursor, (b) at least one difunctional carboxylic acid or a reactive derivative thereof, and (c) at least one dihydric phenol of Formula VI (hereinafter referred to as copolyester-carbonate resin D).

The blends of this embodiment contain an amount of resin C effective to improve the heat resistance of the blends. Generally this amount is in the range of from about 5 to about 90 weight percent, preferably from about 10 to about 80 weight percent, based on the amount of copolyester-carbonate resins C and D present in the blends.

These blends may also optionally contain the various aforedescribed additives, particularly a flame retardant amount of at least one flame retardant additive selected from the alkali and alkaline earth metal salts of sulfonic acids, and an impact modifying amount of at least one impact modifier of the type described hereinafore.

Also included with the scope of the instant linear copolyester-carbonates are the randomly branched linear copolyester-carbonates. These branched copolyester-carbonates may be prepared by the use of the branching agent described hereinafore for the preparation of the randomly branched polycarbonates.

The high molecular weight linear aromatic copolyester-carbonates of the instant invention generally have a number average molecular weight in the range of from about 5,000 to about 200,000, preferably in the range of from about 10,000 to about 100,000.

The term linear polycarbonate resins, as used with respect to the polycarbonates of the instant invention, includes both the branched polycarbonates and the non-branched polycarbonates of the instant invention.

Likewise, the term linear copolyester-carbonates, as used with respect to the copolyester-carbonates of the instant invention, includes both the branched copolyester-carbonates and the non-branched copolyester-carbonates of the instant invention.

Also included within the scope of the instant invention are blends of the copolyester-carbonates of the instant invention (copolyester-carbonate resins C) with the polycarbonates of the instant invention (polycarbonate resins A); blends of copolyester-carbonate resins of the instant invention (copolyester-carbonate resins C) with conventional polycarbonates (polycarbonate resins B); and blends of the polycarbonates of the instant invention (polycarbonate resins A) with conventional copolyester-carbonates (copolyester-carbonate resins D).

These blends may generally contain from about 1 to about 99 weight percent of the copolyester-carbonate resin and from about 99 to about 1 weight percent of the polycarbonate resin, preferably from about 5 to about 95 weight percent of the copolyester-carbonate resin and from about 95 to about 5 weight percent of the polycarbonate resin. These blends may also optionally contain the additives described hereinafore, particularly a flame retardant amount of a flame retardant additive, and an impact modifying amount of an impact modifier.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis unless otherwise indicated.

The following examples illustrate polycarbonates falling outside the scope of the instant invention and are presented for comparative purposes only.

EXAMPLE 1

This example illustrates the preparation of a bisphenol-A polycarbonate.

Into a mixture of 2283 grams of pure 4,4'-isopropylidenebisphenol (bisphenol-A), 5700 grams water, 9275 grams methylene chloride, 32.0 grams phenol, and 10 grams of triethylamine, are introduced, at ambient temperature, 1180 grams of phosgene over a period of 97 minutes while maintaining the pH of the two phase system at about 11, i.e., pH 10–12.5, by simultaneously adding a 25% aqueous sodium hydroxide solution. At the end of the addition period, the pH of the aqueous phase is 11.7 and the bisphenol-A content of this phase is less than 1 part per million (ppm) as determined by ultraviolet analysis.

The methylene chloride phase is separated from the aqueous phase, washed with an excess of dilute (0.01N) aqueous HCl and then washed three times with deionized water. The polymer is precipitated by steam and dried at 95° C. The resultant, pure bisphenol-A polycarbonate has an intrinsic viscosity (IV) in methylene chloride at 25° C. of 0.572 dl/gm and a second order glass transition temperature of 149° C.

The second order glass transition temperature is determined by using a Perkins-Elmer DSC-2B instrument which measures the second order glass transition temperature (Tg) by differential scanning calorimetry. The Tg is an indication of the heat resistance of the polymer. Generally, the higher the Tg the more heat resistant the polymer.

EXAMPLE 2

This example illustrates the preparation of a dimethyl substituted cyclododecylidene polycarbonate falling outside the scope of the instant invention.

Into a slurry of 9.5 grams (0.025 mole) of 1,1-bis(3-methyl-4-hydroxyphenyl)cyclododecane, 0.1 milliliter of triethylamine, 0.02 gram (1 mole %) of phenol, 200 milliliters of methylene chloride, and 150 milliliters of water there are added sufficient 25% aqueous sodium hydroxide solution to bring the pH to 11.0. Phosgene is then introduced into this reaction mixture at the rate of 0.5 gram per minute for a period of 10 minutes while maintaining the pH of the reaction mixture at 10.5–11.4 by the addition of the aqueous caustic solution. After addition of the phosgene ceases the methylene chloride phase is separated from the aqueous phase, washed with an excess of dilute (0.01N) aqueous HCl, and is then washed three times with deionized water. The polymer is then precipitated with methanol and dried at 95° C. The Tg of this polymer is determined to be 202° C.

EXAMPLE 3

This example illustrates the preparation of a cyclohexylidene polycarbonate falling outside the scope of the instant invention.

To a reactor vessel is added an aqueous caustic solution of 26.8 grams (0.1 mole) of 4,4'-cyclohexylidenebisphenol, 8 grams of sodium hydroxide, and 710 milliliters of water, followed by the addition of 0.3 milliliter of triethylamine and 400 milliliters of methylene chloride. Phosgene is introduced into this well stirred mixture at a rate of 0.5 gram per minute for a period of 10 minutes while maintaining the pH at 12.4 by the use of a 25% aqueous sodium hydroxide solution. The pH is then lowered to 11 and additional phosgene is introduced into the reaction mixture at a rate of 0.5 gram per minute for 32 minutes. After the addition of the phosgene ceases the methylene chloride phase is separated from the aqueous phase, washed with dilute (0.01N) HCl, and is then washed three times with deionized water. The polymer is precipitated with methanol and dried at 95° C. The Tg of this polymer is determined to be 171° C.

EXAMPLE 4

This example illustrates the preparation of a dialkylated cyclohexylidene polycarbonate falling outside the scope of the instant invention.

To a reactor vessel are introduced 2965 grams (10 moles) of 1,1-bis(3-methyl-4-hydroxyphenyl) cyclohexane, 7 liters of methylene chloride, 5.5 liters of water, 28 milliliters of triethylamine, and 32.9 grams of phenol. Sufficient 25% aqueous sodium hydroxide solution is added to this reaction mixture to maintain a pH of about 11. Phosgene is then introduced into the reaction mixture at a rate of 36 grams per minute for a period of 32 minutes while maintaining the pH at about 11 by the use of the aqueous sodium hydroxide solution. After addition of the phosgene ceases the methylene chloride phase is separated from the aqueous phase, washed with dilute (0.01N) HCl, and washed three times with deionized water. The polymer is then precipitated by steam and dried at 95° C. The Tg of this polymer is determined to be 132° C.

EXAMPLE 5

This example illustrates the preparation of a dialkyl substituted cyclopentadecylidenebisphenol polycarbonate falling outside the scope of the instant invention.

Into a reaction mixture containing 5 grams (0.0118 mole) of 1,1-bis(3-methy-4-hydroxyphenyl) cyclopentadecane (m.p. 213°–214° C.), 0.033 milliliter of triethylamine, 400 milliliters of methylene chloride, and 300 milliliters of water there is added sufficient 25% aqueous sodium hydroxide solution to bring the pH of the reaction mixture to about 11. Phosgene is then introduced into this well stirred reaction mixture at a rate of 0.5 gram per minute for a period of 6.5 minutes while maintaining the pH at about 11 by the use of the aqueous caustic solution. After addition of the phosgene ceases the reaction mixture is stirred for 5 minutes, the methylene chloride phase is separated from the aqueous phase, and is washed once with dilute (0.01N)HCl and three times with deionized water. The polymer is precipitated with methanol and dried at 95° C. The Tg of this polymer is determined to be 159° C.

EXAMPLE 6

This examples illustrates the preparation of 4,4 -cyclooctylidenebisphenol polycarbonate falling outside the scope of the instant invention.

Into a solution containing 4 grams (0.0135 mole) of 1,1-bis(4-hydroxyphenyl) cyclooctane (m.p. 197°–199° C.) and 100 milliliters of pyridine, there is introduced phosgene at a rate of 0.2 gram per minute for a period of 20 minutes. During the phosgene addition period the originally colorless solution turns a muddy green color. After the phosgene addition ceases the reaction mixture is stirred for 10 minutes. The reaction mixture is then added to an excess of methanol and stirred in a Warring blender. The precipitated polymer is filtered, and the filter cake is then slurried with water, filtered and washed. The filter cake is dried in a vacuum oven at 50° C. The resultant polycarbonate is found to have an intrinsic viscosity in methylene chloride at 25° C. of 0.427 dl/gm. This polymer has a second order glass transition temperature, Tg, of 145° C.

The following examples illustrate the preparation of the novel tetraalkyl substituted cycloalkylidene bisphenols of the instant invention.

EXAMPLE 7

This example illustrates the preparation of 1,1-bis(3,5-dimethyl-4-hydroxyphenyl)cyclododecane.

Into a solution of 182.3 grams (1.0 mole) of cyclododecanone, 558 grams (4.6 moles) of 2,6-xylenol, 210 milliliters of methylene chloride, and 9 milliliters of n-butyl mercaptan there is introduced anhydrous hydrogen chloride while maintaining the temperature of the reaction mixture at about 20° C. Stirring is carried on during the hydrogen chloride addition. Solids begin to separate out from the reaction mixture and when the reaction mixture becomes too thick to stir an additional 100 milliliters of methylene chloride are added. The reaction is followed by gas chromatographic analysis of samples removed from the reaction mixture. When gas chromatographic analysis of the samples taken from the reaction mixture indicates the absence of the macrocyclic ketone the reaction mixture is filtered by suction and the solids are washed with methylene chloride. The solids are then slurried up with fresh methylene chloride, filtered and rinsed again with more solvent. Analysis by gas chromatography of the dried solids, which melted at 239°–240.5° C., showed that they had a retention time of 27.85 minutes relative to p-cumylphenol which emerged at 13.91 minutes.

EXAMPLE 8

This example illustrates the preparation of 1,1-bis(3,5-dimethyl-4-hydroxyphenyl)cyclooctane.

Into a warm reaction mixture containing 6.3 grams (0.05 mole) cyclooctanone, 122.1 grams (1.0 mole) of 2,6-xylenol and 0.5 milliliter of n-butyl mercaptan there is introduced, with stirring, anhydrous hydrogen chloride gas while maintaining the temperature of the reaction mixture between 50°–72° C. Solids begin to separate out from the reaction mixture and when the reaction mixture becomes too thick to stir methylene chloride is added. The reaction is followed by gas chromatographic analysis of samples removed from the reaction mixture. When gas chromatographic analysis of the samples taken from the reaction mixture indicates the absence of the macrocyclic ketone the reaction mixture is filtered by suction and the solids are washed with-methylene chloride. The solids are then recrystallized with methanol. Analysis by gas chromatography of the solids, which melt at 253°–254.2° C., show that they have a retention time of 24.35 minutes relative to p-cumyl phenol which emerges at 13.56 minutes.

EXAMPLE 9

This example illustrates the preparation of 1,1-bis(3,5-dimethyl-4-hydroxyphenyl)cyclopentadecane.

Into a solution containing 2 grams (0.009 mole) of cyclopentadecanone, 5.5 grams (0.045 mole) of 2,6-xylenol, 0.1 milliliter of n-butyl mercaptan, and 2 milliliters of methylene chloride there is introduced, with stirring, anhyrous hydrogen chloride gas while maintaining the temperature of the reaction mixture at 15°–16° C. Solids begin to separate out from the reaction mixture and when the reaction mixture becomes too thick to stir an additional 3 milliliters of methylene chloride are added. The reaction is followed by gas chromatographic analysis of samples removed from the reaction mixture. When gas chromatographic analysis of these samples indicates the absence of the macrocyclic ketone the reaction mixture is filtered and the solids are washed with methylene chloride. The solids are recrystallized from methanol. Analysis by gas chromatography of the solids, which have a melting point of 233°–234.5° C., shows that they have a retention time of 28.80 minutes relative to p-cumyl phenol which emerges at 14.06 minutes.

The following example illustrates a polycarbonate of the instant invention.

EXAMPLE 10

Into a solution containing 5 grams (0.0122 mole) of 1,1-bis(3,5-dimethyl-4-hydroxyphenyl)cyclododecane and 60 milliliters of pyridine there is introduced phosgene at a rate of 0.2 gram per minute for a period of 25 minutes. At the end of the phosgene addition period 100 milliliters of methylene chloride are added and the resultant solution is washed repeatedly with cold dilute (0.01N) aqueous HCl until the solution is substantially free of pyridine. This solution is dried and filtered. The solution contains the bischloroformate of 1,1-bis(3,5-dimethyl-4-hydroxyphenyl)cyclododecane as evidenced by its strong infrared absorption at 1780 cm$^{-1}$.

This methylene chloride solution containing the bischloroformate of 1,1-bis(3,5-dimethyl-4-hydroxyphenyl)cyclododecane is added to a mixture containing 2.78 grams (0.0122 mole) of bisphenol-A, 200 milliliters of methylene chloride, 100 milliliters of water, and 0.1 milliliter of triethyl amine, maintained at a pH of 11. This methylene chloride solution is added to said mixture dropwise over a period of 8 minutes. The resultant reaction mixture is stirred for 80 minutes. The methylene chloride phase is recovered from the aqueous phase, and is washed with dilute (0.01N) aqueous HCl and with water. The methylene chloride solution is then concentrated to a volume of 20 milliliters by evaporation.

The polymer is precipitated with acetone, is filtered and is dried in a vacuum oven at 100° C. The resultant polymer has an intrinsic viscosity in methylene chloride at 25° C. of 0.28 dl/gm and a Tg of 240° C.

TABLE I

| Example No. | Dihydric Phenol | Tg of resultant Polycarbonate |
|---|---|---|
| 1 (comparative) | HO–⟨C$_6$H$_4$⟩–C(CH$_3$)$_2$–⟨C$_6$H$_4$⟩–OH | 149° C. |
| 2 (comparative) | 3,3',5,5'-tetramethyl bisphenol with cyclopentane bridge (H$_3$C and CH$_3$ on rings; C with cyclopentyl) | 202° C. |
| 3 (comparative) | HO–⟨C$_6$H$_4$⟩–C(cyclopentyl)–⟨C$_6$H$_4$⟩–OH | 171° C. |
| 4 (comparative) | H$_3$C and C$_3$H substituted bisphenol with cyclopentane bridge | 132° C. |
| 5 (comparative) | 3,3',5,5'-tetramethyl bisphenol with cyclododecane bridge | 159° C. |
| 6 (comparative) | HO–⟨C$_6$H$_4$⟩–C(cyclododecyl)–⟨C$_6$H$_4$⟩–OH | 145° C. |
| 10 | 50 mole % [bis(3,5-dimethyl-4-hydroxyphenyl)cyclododecane] and 50 mole % [HO–⟨C$_6$H$_4$⟩–C(CH$_3$)$_2$–⟨C$_6$H$_4$⟩–OH] | 240° C. |

TABLE I-continued

| Example No. | Dihydric Phenol | Tg of resultant Polycarbonate |
|---|---|---|
| | 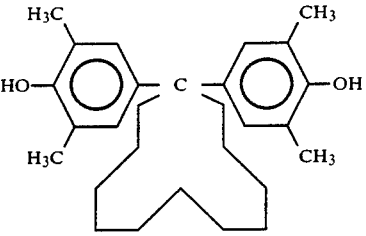 | |

As illustrated by the foregoing examples and the data in Table I not all of the dihydric phenols containing cyclaolkylidene bridging groups yield polycarbonates having improved Tgs. There is a wide variation in the second order glass transition temperatures of these cycloalkylidene conatining polycarbonates. Indeed, some of these cycloalkylidene containing polycarbonates exhibit lower Tgs than the conventional alkylidene bontaining polycarbonates such as those based on bisphenol-A. Thus, while a polycarbonate derived from 4,4'-cyclohexylidene bisphenol (Example 3) has a higher Tg than a polycarbonate derived from 1,1-bis(4-hydroxyphenyl)propane (Example 1), a polycarbonate derived from 1,1-bis(3-methyl-4hydroxyphenyl)cyclohexane (Example 4) has a Tg which is lower than that of said bisphenol-A type polycarbonate.

The presence of larger cycloalkylidene bridging groups in the dihydric phenol does not insure that the resultant polycarbonates will exhibit higher second order glass transition temperatures. Thus, a polycarbonate derived from 1,1-bis(3-methyl-4-hydroxyphenyl) cyclopentadecane (Example 5) has a lower Tg than a polycarbonate derived from the smaller cycloalkylidene containing bisphenol 1,1-bis(3-rethyl -4-hydroxyphenyl) cyclododecane (Example 2). Indeed, the polycarbonate derived from the 1,1-bis(3-methyl-4-hydroxyphenyl) cyclopentadecane (Example 5) has a lower Tg than a polycarbonate derived from the much smaller cycloalkylidene containing bisphenol 4, 4'-cyclohexylidene bisphenol (Example 3).

The carbonate polymer of the instant invention (Example 10) which is derived from 50 mole percent bisphenol-A and 50 mole percent 1,1-bis(3,5-dimethyl4-hydroxyphenyl)cyclododecane has a Tg of 240° C. as compared with a Tg of 202° C. of a similar polycarbonate falling outside the scope of the instant invention derived from 100 percent of 1,1-bis(3-methyl-4-hydroxyphenyl)cyclododecane (Example 2).

The carbonate polymers of the instant invention are useful in making films, sheets, molded articles, and the like.

Obviously, other modifications and variations of the present invention are possible in light of the above teachings. It is, therefore, understood that changes may be made in the particular embodiments of the invention described and claimed which are within the full intended scope of the invention as defined by the appended claims.

What is claimed is:
1. Thermoplastic polymeric composition exhibiting improved heat resistance comprised of (i) at least one thermoplastic high molecular weight carbonate polymer comprised of the reaction products of:
   (a) a carbonate precursor; and
   (b) at least one dihydric phenol represented by the general formula

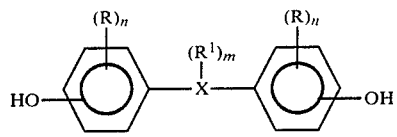

wherein
R is independently selected from alkyl radicals, each n is two,
$R^1$ is independently selected from monovalent hydrocarbon radicals,
X represents a cycloalkylidene radical containing from 10 to about 16 ring carbon atoms, and
m represents a whole number having a value of from 0 up to the number of replaceable hydrogen atoms present on X.

2. The composition of claim 1 wherein m has a value of from 0 to 6.
3. The composition of claim 2 wherein m is 0.
4. The composition of claim 3 wherein said alkyl radicals represented by R are lower alkyl radicals.
5. The composition of claim 4 wherein said lower alkyl radicals contain from 1 to about 4 carbon atoms.
6. The composition of claim 3 wherein X represents a cycloalkylidene radical containing from 11 to about 16 ring carbon atoms.
7. The composition of claim 6 wherein X represents a cycloalkylidene radical containing from 12 to 16 ring carbon atoms.
8. The composition of claim 4 wherein said dihydric phenol is represented by the formula

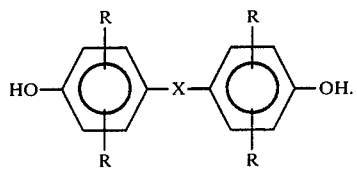

9. The composition of claim 8 wherein X represents a cycloalkylidene radical containing from 11 to about 16 ring carbon atoms.
10. The composition of claim 9 wherein X represents a cycloalkylidene radical containing from 12 to 16 ring carbon atoms.
11. The composition of claim 8 wherein said carbonate precursor is phosgene.
12. The composition of claim 8 wherein said dihydric phenol is represented by the general formula

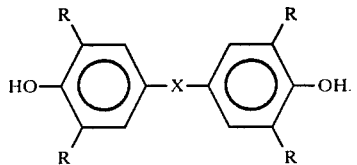

13. The composition of claim 12 wherein X represents a cycloalkylidene radical containing from 11 to about 16 ring carbon atoms.

14. The composition of claim 13 wherein X represents a cycloalkylidene radical containing from 12 to 16 ring carbon atoms.

15. The composition of claim 14 wherein X represents the cyclododecylidene radical.

16. The composition of claim 15 wherein each R is methyl.

17. The composition of claim 16 wherein said carbonate precursor is phosgene.

18. The composition of claim 1 which further contains a flame retardant amount of at least one flame retardant compound.

19. The composition of claim 18 wherein said flame retardant compound is selected from the organic salts of the alkali or alkaline earth metal salts of sulfonic acids.

20. The composition of claim 1 which further contains an impact modifying amount of at least one impact modifying compound.

21. The composition of claim 1 wherein said thermoplastic polymer (i) is comprised of the reaction products of:
(a);
(b); and
(c) at least one dihydric phenol represented by the general formula

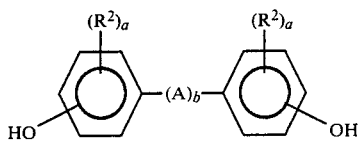

wherein
R² is independently selected from halogen radicals, monovalent hydrocarbon radicals, or monovalent hydrocarbonoxy radicals,
A is selected from alkylene radicals, alkylidene radicals, cycloalkylene and cycloalkylidene radicals containing from 4 to 6 ring carbon atoms,

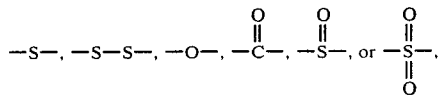

b is either zero or one, and
a is independently selected from whole numbers having a vlue of from 0 to 4 inclusive.

22. The composition of claim 21 wherein the amount of said dihdyric phenol (b) used is an amount effective to improve the heat resistance thereof.

23. The composition of claim 22 wherein amount of (b) is from about 5 to about 90 ght percent, based on the amount of dihydric phenols (b) and (c) used.

24. The composition of claim 23 wherein said amount is from about 10 to about 80 weight percent.

25. The composition of claim 22 wherein b is one.

26. The composition of claim 25 wherein A is selected from alkylene or alkylidene radicals.

27. The composition of claim 26 wherein R² is independently selected from monovalent hydrocarbon radicals.

28. The composition of claim 27 wherein a is zero and A is an alkylidene radical.

29. The composition of claim 28 wherein said dihydric phenol is bisphenol-A.

30. The composition of claim 29 wherein said dihydric phenol (b) is represented by the general formula

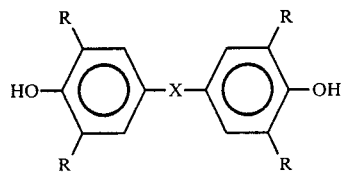

wherein each R is independently selected from lower alkyl radicals.

31. The composition of claim 30 wherein X represents the cyclododecylidene radical.

32. The composition of claim 31 wherein each R is methyl.

33. The composition of claim 32 wherein said carbonate precursor is phosgene.

34. The composition of claim 22 which further contains a flame retardant amount of at least one flame retardant compound.

35. The composition of claim 34 wherein said flame retardant compound is selected from the organic alkali or alkaline earth metal salts of sulfonic acids.

36. The composition of claim 32 which further contains an impact modifying amount of at least one impact modifying compound.

37. The composition of claim 1 which further contains (ii) at least one thermoplastic resin comprised of the reaction products of:
(d) a carbonate precursor; and
(e) at least one dihydric phenol represented by the general formula

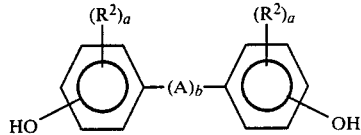

wherein
R² is independently selected from halogen radicals, monovalent hydrocarbon radicals, or monovalent hydrocarbonoxy radicals,
A is selected from alkylene radicals, alkylidene radicals, cycloalkylene or cycloalkylidene radicals containing from 4 to 6 ring carbon atoms,

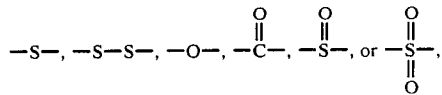

b is either zero or one, and
a is independently selected from whole numbers having a value of from 0 to 4 inclusive.

38. The composition of claim 37 which contains an amount of polymer (i) effective to improve the resistance thereof.

39. The composition of claim 38 wherein said amount of polymer (i) is in the range of from about 5 to about 90 weight percent, based on the total amounts of polymer (i) and resin (ii) present.

40. The composition of claim 39 wherein said amount is in the range of from about 10 to about 80 weight percent.

41. The composition of claim 38 wherein b is one.

42. The composition of claim 41 wherein A is selected from alkylene or alkylidene radicals.

43. The composition of claim 42 wherein said dihydric phenol (b) of polymer (i) is represented by the general formula

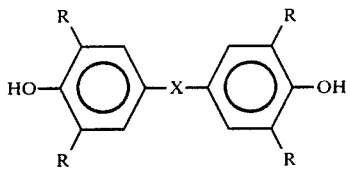

wherein each R is independently selected from lower alkyl radicals.

44. The composition of claim 43 wherein X is the cyclododecylidene radical.

45. The composition of claim 44 wherein each R is a methyl radical.

46. The composition of claim 45 wherein said dihydric phenol (e) of resin (ii) is bisphenol-A.

47. The composition of claim 46 wherein said carbonate precursor is phosgene.

48. The composition of claim 38 which further contains a flame retardant amount of at least one flame retardant compound.

49. The composition of claim 48 wherein flame retardant compound is selected from the organic alkali or alkaline earth metal salts of sulfonic acids.

50. The composition of claim 38 which further contains an impact modifying amount of at least one impact modifying compound.

* * * * *